March 2, 1971
T. O. PAINE
ADMINISTRATOR OF THE NATIONAL AERONAUTICS
AND SPACE ADMINISTRATION
MULTIDUCTED ELECTROMAGNETIC PUMP
3,567,339
Filed April 16, 1969
2 Sheets-Sheet 1
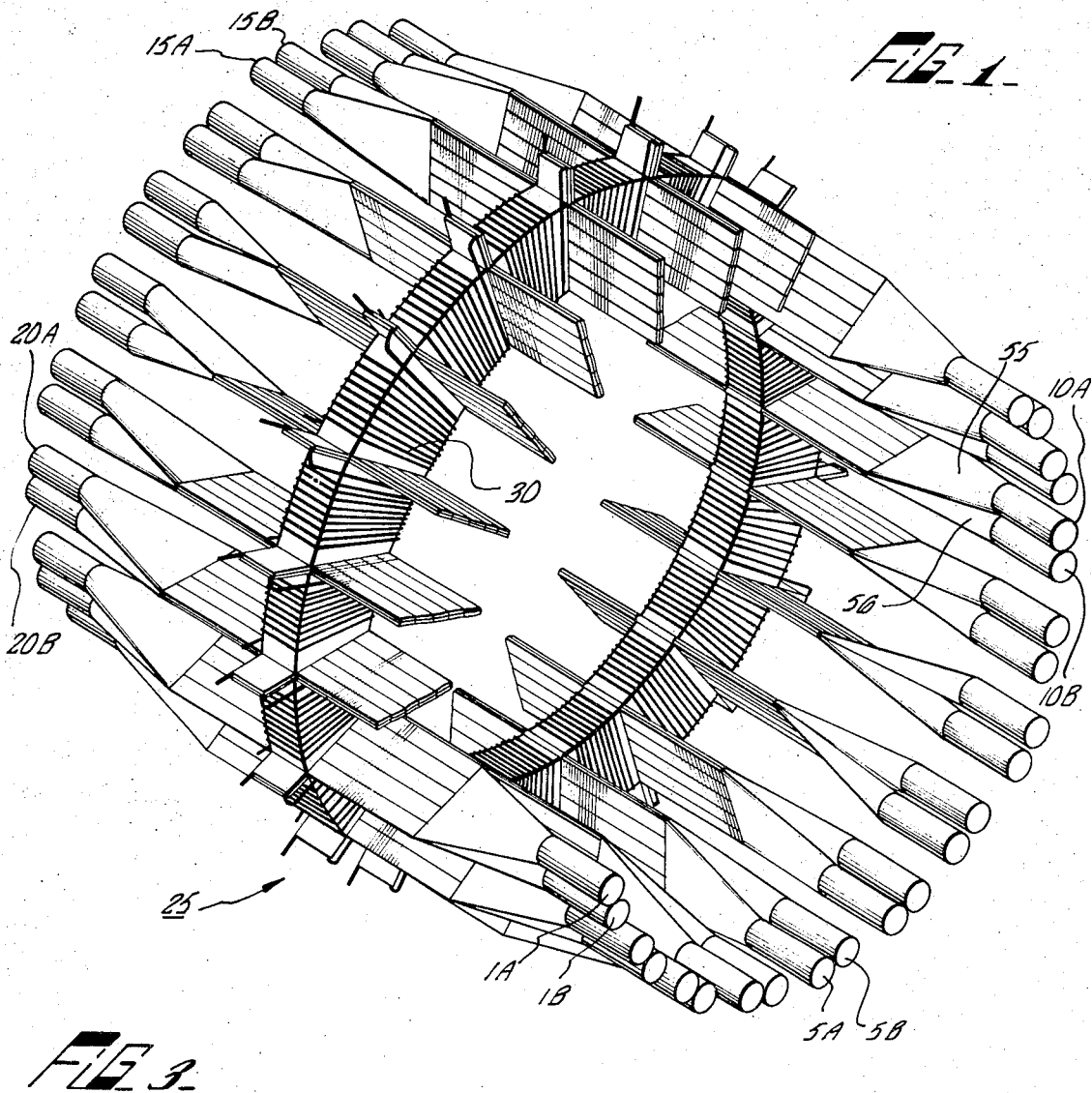
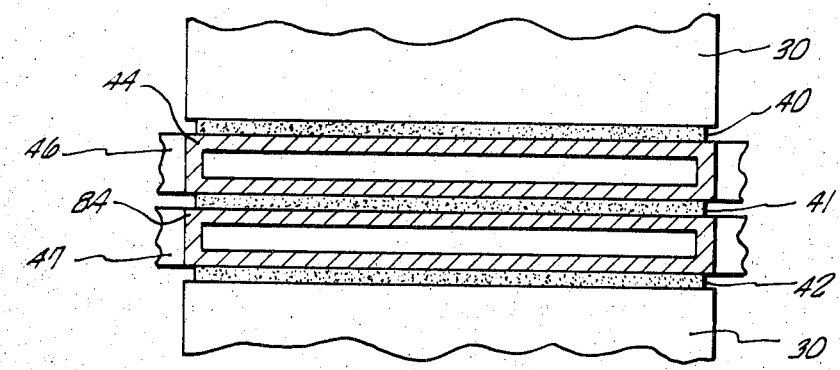
INVENTORS.
JERRY P. DAVIS
GERALD M. KIKIN
BY
ATTORNEYS March 2, 1971   T. O. PAINE   3,567,339
ADMINISTRATOR OF THE NATIONAL AERONAUTICS
AND SPACE ADMINISTRATION
MULTIDUCTED ELECTROMAGNETIC PUMP Filed April 16, 1969   2 Sheets-Sheet 2

INVENTORS.
JERRY P. DAVIS
GERALD M. KIKIN

ATTORNEYS.

United States Patent Office 3,567,339
Patented Mar. 2, 1971

3,567,339
MULTIDUCTED ELECTROMAGNETIC PUMP
T. O. Paine, Administrator of the National Aeronautics and Space Administration, with respect to an invention of Jerry P. Davis, La Canada, and Gerald M. Kikin, Pasadena, Calif.
Filed Apr. 16, 1969, Ser. No. 816,733
Int. Cl. F04b *19/00*
U.S. Cl. 417—50                        10 Claims

ABSTRACT OF THE DISCLOSURE

An apparatus for pumping conductive liquids is described which comprises a single toroidal electromagnetic pump structure wherein there are a plurality of pump passages with each passage having a two pump duct sandwich therein. Each pump duct has associated therewith a plural tube header assembly connected to its input and output portions. Each tube of the plural tube header assemblies is electrically insulated from adjacent tubes thereby minimizing the bypass current flow. Current flow through each twin pump duct combination is in a counter flow arrangement to minimize field distortion. The single toroidal pump structure may therefore comprise any convenient number of individual pumps formed within the compact configuration.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION (1) Field of the invention

This invention relates to fluid pump systems and more particularly to direct current electromagnetic pumps capable of pumping conductive fluids.

(2) Description of the prior art

The basic principles behind the operation of DC electromagnetic pumps are well-known and involve the application of Faraday's Law. In general, a conductive liquid flows through a thin-walled tube of metal of high electrical resistivity. Conductive bus bars are attached to opposite sides of the tube, and the assembly is placed between the poles of an electromagnet. Current entering through the tube wall traverses the liquid in the tube and develops a longitudinal thrust therein.

Direct current electromagnetic pumps have found their most significant use in power conversion systems which utilize liquid metals as reactor coolants. Conventional electromagnetic pumps have a C-shaped magnet structure surrounding a single flow channel. The magnet is generally the heaviest component in the system. Therefore, the use of such direct current electromagnetic pumps has been restricted by weight requirements in such applications as metal cooled space power conversion systems which often require a large number of separate pump channels. While weight requirements may not be as significant in connection with ground based installations, the power required to energize the large number of electromagnets associated with prior art plural pump installations has heretofore restricted their usefulness.

Another disadvantage of conventional DC electromagnetic pumps results from the fact that the magnetic field produced by the flow of current across the pump tube distorts the field between the magnetic poles by introducing a component which increases the resultant field intensity on the upstream end and decreases it on the downstream end. This inhomogeneity in the field along the length of the tube produces a greater counter E.M.F. in the moving liquid on the upstream end than on the downstream side with the result that the current distribution along the length of the tube is not uniform but is increased downstream and reduced toward the upstream end. Thus, the resultant current and field distribution is such that the regions of highest current density are in regions of lowest field intensity resulting in a significant lowering of the pumping capacity. One prior art technique for compensating for this effect utilizes an opposing field produced by an equal current flowing in the opposite direction in a conductor which is located above and/or below the pump tube. This method of compensation, however, has the disadvantage that the magnetic gap must be considerably increased to provide room for the compensating bus bars, thus significantly increasing the power requirements for generating the electromagnetic field. A second prior art method involves tapering the magnet poles so that the magnetic gap is wider toward the upstream end. In addition, the tube cross sectional areas have been tapered so that the velocity of the liquid increases in the downstream direction at a rate such that the counter E.M.F. in the liquid remains constant as the liquid traverses the region between the poles. This second method suffers from the increased hydraulic losses resulting from a tapered tube configuration and increased tube fabrication difficulties.

A further limitation upon the prior art devices results from the significant bypass current flow characteristic of prior art devices. Bypass current flow represents current that by-passes the pump duct and thereby represents power loss.

OBJECTS AND SUMMARY OF THE INVENTION

This invention obviates the above-mentioned shortcomings by providing a plurality of electrically independent liquid metal pumps of minimum weight utilizing a single common magnet structure. The magnet structure has a plurality of gaps located therein equal to one-half the total number of individual pumps required. Within each gap there is located a symmetrical two pump duct sandwich wherein the ducts are electrically isolated from each other and from the magnetic pole faces by suitable insulation. A magnet copper winding is associated with each pump duct and may be in electrical series connection therewith. Bus bars are disposed on opposite sides of each pump duct. Current is caused to flow in each pump duct sandwich in a counterflow arrangement to minimize magnetic field distortion.

A plural tube header assembly is attached to the inflow and outflow portion of each pump duct. Each tube in the header assembly is electrically isolated from all adjacent tubes to minimize the bypass current flow. The common magnet structure can accommodate any reasonable number of pump circuits necessary for a given system and hence can be custom fabricated to meet the exact needs of particular systems without loss of efficiency. The large number of individual pumps of the prior art, each having individual magnets, are replaced by 9 single magnet compact design wherein magnetic flux losses and bypass current flow losses are significantly reduced.

It is therefore an object of this invention to provide a plural electromagnetic pump apparatus of minimum weight.

It is another object of the present invention to provide a plural electromagnetic pump apparatus utilizing only a single magnet structure.

It is a further object of the present invention to provide an electromagnetic pump having minimum magnetic field distortion.

Still another object of the instant invention is to provide an electromagnetic pump apparatus having minimum bypass current flow losses.

Still other objects, features and attendant advantages of the present invention will become apparent to those skilled in the art from a reading of the following detailed description of several embodiments constructed in accordance therewith taken in conjunction with the accompanying drawings and wherein:

BRIEF DESCRIPTION OF THE DRAWINGS

FIG. 1 is a perspective view of a toroidal pump structure constructed in accordance with the present invention;

FIG. 3 is a cross-sectional view taken along line 3—3 of FIG. 2;

DESCRIPTION OF THE PREFERRED EMBODIMENT

Figure 2:
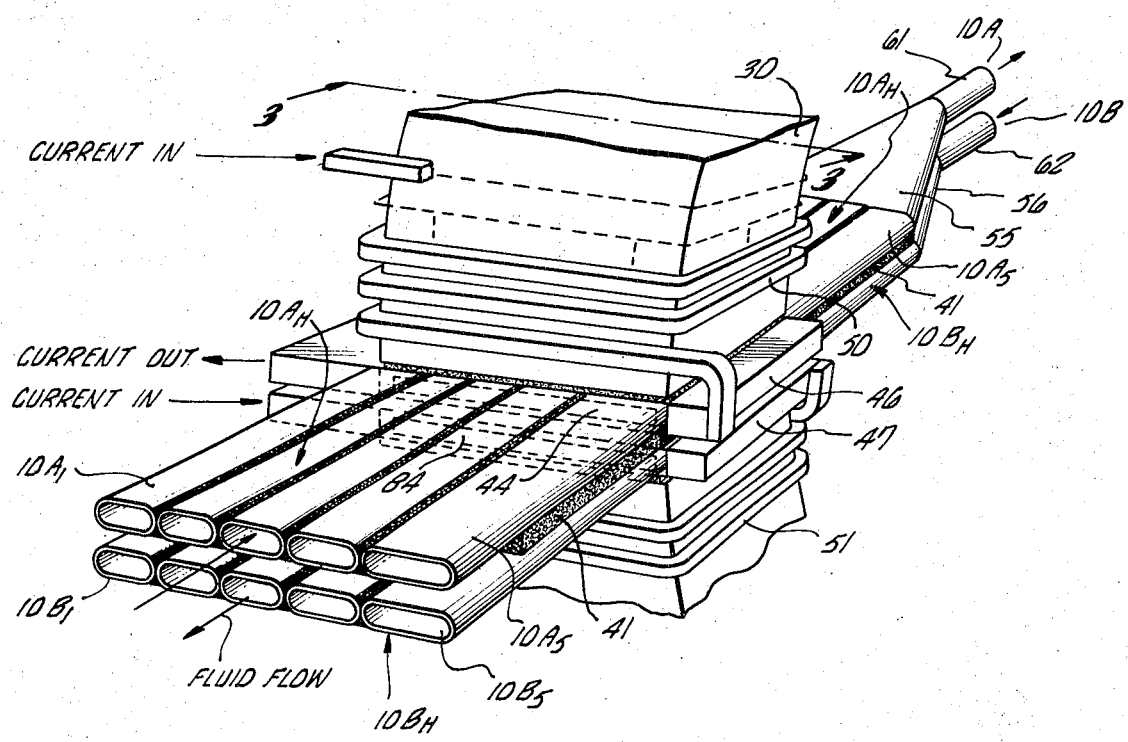
FIG. 2 is a perspective view of one of the two pump duct subsections of FIG. 1.

Referring now to the drawings, FIG. 1 shows a single toroidal pump structure 25 which actually comprises 40 individual pumps 1A, 1B to 20A, 20B formed into a compact ring-shaped configuration. The ring structure is subdivided into 20 symmetrical subsections with each subsection being comprised of a two pump duct sandwich as will be described hereinafter.

Referring now to FIG. 2, there is shown a typical two duct pump section comprising symmetrical pump pair 10A and 10B. Pump 10A comprises a transmission tube 61 which is connected to a transition section 55. Transition section 55 connects transmission tube 61 to a five flattened tube header assembly $10A_H$ which is welded to the rectangular cross section pump duct 44. Each tube $10A_1$–$10A_5$ of the header assembly $10A_H$ is electrically insulated from adjacent tubes by a layer of suitable insulation material such as alumina. The insulation serves to prevent bypass current flow in the area adjacent to the pump ducts. Conductive liquid is pumped in pump duct 44 into a second five flattened tube header assembly $10A_H'$, then through a second transition section to a second transmission tube (not shown). The structure of pump 10B is identical to that described above for pump 10A.

A magnetic copper coil 50 containing a suitable number of windings is wound around magnetizable material 30 in series electrical connection with copper bus bar 46. A second copper winding coil 51 is connected in series electrical connection to copper bus bar 47, associated with pump duct 84. Bus bars 46 and 47 are, as shown, disposed on each side of pump ducts 44 and 84 respectively, so as to make electrical connection therewith and therethrough with the electrically conductive fluid. As shown, the current in bus bar 46 and therefore in pump duct 44 is caused to flow opposite to that in bus bar 47 and pump duct 84. This counter flow arrangement serves to minimize "armature reaction" effects and results in opposite liquid flow as will be explained in greater detail later.

Referring now to FIG. 3, there is shown a cross-sectional view of the dual pump duct configuration of FIG. 2. Magnetizable material 30 is separated from pump ducts 44 and 45 by layers of insulation material 40 and 42 respectively, which layers may be fabricated from any suitable temperature resistant insulation material such as alumina. Ducts 44 and 84 are separated and electrically insulated from each other by a layer of alumina insulation 41. Insulation layer 41 also serves to insulate header assembly $10A_H$ from header assembly $10B_H$ as shown in FIG. 2, thus assuring that pump channel 10A and 10B are electrically isolated.

Although the preferred embodiment has thus far been described as having the magnet field windings in electrical series connection with the pump ducts such is not a requirement. The field and duct circuits may be isolated and separately supplied if such control is desired.

Figure 4:
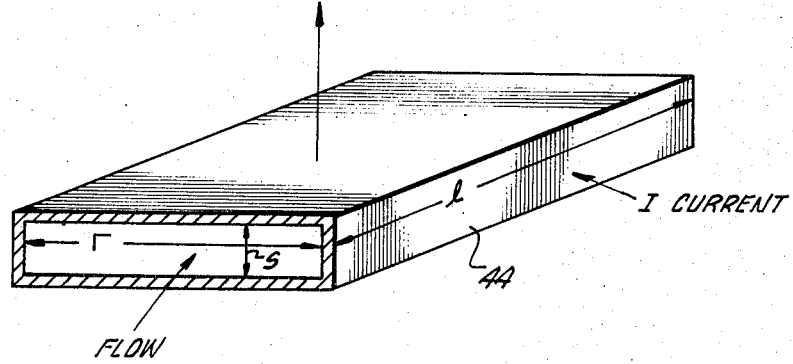
FIG. 4 is a perspective view of an elementary pump duct section.

Referring now to FIG. 4, there is shown an elementary representative pump duct section 44 of width $r$, height $s$ and length $l$.

The direction of the magnetic flux field B and current flow I is as indicated. The relation between the total current I flowing through the elementary pump duct section and the various electrical characteristics of the elementary pump duct section 44 may be obtained from the standard DC electromagnetic pump design equation:

$$I = \left(\frac{R_w + R_b}{R_w R_b}\right)(E_c + I_e R_e) + I_e \quad (1)$$

where:

$E_c$ = the counter-electromotive force developed in the liquid as it moves through the magnetic field.
$R_w$ = the resistance of the bypass path through the tube wall.
$R_e$ = the resistance of the effective current path through the liquid.
$R_b$ = the resistance of the bypass path in the liquid.
$I_e$ = the current traversing the liquid which lies in the strong magnetic field.

The relation between the liquid metal flow and the various circuit perimeters may be likewise determined from the standard design equation:

$$Q = \frac{10^3 s}{B}\left[I\left(\frac{R_w R_b}{R_w + R_b}\right) - \frac{10 ps}{B}\left(R_e + \frac{R_w R_b}{R_w + R_b}\right)\right] \quad (2)$$

where:

Q = liquid metal flow,
p = pressure rise
B = flux density
s = fluid channel height in the pump duct.

Rearranging and solving for I gives:

$$I = \frac{E_c}{R'} + \frac{P_f}{E_c}\left(\frac{R_e + R'}{R'}\right) \quad (3)$$

where:

$$R' = \frac{(R_w R_b)}{(R_w + R_b)} \quad (4)$$

equals effective resistance for all current bypass paths and $P$ = fluid pumping power = $I_e E_c$ One of the main pump design criteria is minimum current consumption at fixed pumping power $P_f$. Therefore, Equation 3 may be differentiated with respect to $E_c$. Solving for $E_c$ gives:

$$E_c(\text{min. current}) = [P_f(R_e + R')]^{1/2} \quad (5)$$

Substituting Equation 5 into Equation 3 gives:

$$I = \frac{2}{R'}[P_f(R_e + R')]^{1/2} = \frac{2E_c}{R'} \quad (6)$$

which gives the relationship between the total pump current, the back electromotive force in the pump duct and the overall bypass resistance R'.

In order to determine the overall bypass resistance, use is made of the analysis by D. A. Watt, in "The Design of Electromagnetic Pumps for Liquid Metals," Proc. Inst. Elec. Eng. vol. 106, Part A, 1959. FIG. 11 in this reference plots resistance ratios versus $l/r$ which is the ratio of the length to the width of the pump duct. Therefore, $$R_b = r_0 R_{\text{duct}} = r_0 \left(\frac{R_w R_e}{R_w + R_e}\right) \quad (7)$$

where $r_0$ is obtained from the above-noted reference. For the range of $l/r$ of interest, $r_0$ is closely approximated by $r_0 \cong 1.8 K$
where $$K = l/r \quad (8)$$

Substituting values for $R_w$ and $R_b$ into the equation for duct resistance gives $$R_{duct} = \frac{4.0 \times 10^{-5}}{K(s+0.1)} \quad (9)$$

In order to reduce bypass current paths, an inlet and exit tube configuration, as shown in FIG. 2 is utilized. As above described, the inlet and exit flow headers such as $10A_H$ are formed of plural flattened tubes which are separated by electrical insulation materials such as alumina. Substituting equations 9, 8, and 7 into equation 4 gives $$R' = \frac{3.6 \times 10^{-4}}{s + 0.9K + 0.1} \quad (10)$$

in terms of $E_c$ and $s$ the magnetic flux density, B is $$B = 8.33 \times 10^{-5} \, sE_c \quad (11)$$

Equations 11, 10, 6 and 5 may now be used to design various pumps with K and $s$ as variables.

The magnetic flux density in the pump duct is limited by the maximum flux obtainable in the magnetic structure, and the flux fringing factor $\sigma$. The relationship between the duct areas and associated fluxes is given by $$A_m B_m = A_g B_g \sigma \quad (12)$$

where:
$A_m$ = the magnet cross sectional area
$A_g$ = the duct cross sectional area
$B_m$ = the magnet magnetic flux
$B_g$ = the duct magnetic flux The maximum flux density available in any magnetic alloy is temperature limited. As is well known in all cases the magnet must be operated below its Curie temperature to maintain useful magnetic properties. Therefore the maximum operating temperature anticipated to be experienced by the magnetic structure provides a design limit on the maximum achievable magnetic flux.

OPERATION

As illustrated in FIG. 1, the single toroidal pump structure 25 is adapted to provide a plurality of individual pumps 1A, 1B to 20A, 20B formed into a compact ring-shaped configuration utilizing only a single magnet 30. The magnet copper windings, which are in series with an associated pump duct, receives a current which serves both to create the magnetic flux field and provide a current flow through the liquid metal in the pump duct. The liquid metal flows to each pump through an associated transmission tube thence through an associated five flattened tube header assembly to the associated pump duct section. While in the pump duct section, the interaction of the magnetic flux field with the current flowing in the liquid metal causes an associated thrust to be generated which has the effect of pumping the liquid metal through the duct section. The exiting liquid metal flows through another five flattened tube header then through a second associated transition piece finally returning to the system transmission tubing. Each two pump duct sandwich 1A, 1B to 20A, 20B has counter-flowing electrical duct current thus effecting opposite pumping thrusts. Electrical insulation between each tube of the five flattened tube header assemblies effectively reduces the bypass resistance losses. Various modifications to the preferred embodiment will be apparent to those skilled in the art without involving a departure from the spirit of the scope of my invention.

What is claimed is:

1. A direct current electromagnetic pumping apparatus for individually pumping a multiplicity of independent streams of electrically conductive fluid, said apparatus comprising:

a plurality of electromagnets aligned along a circular axis, a plurality of evenly spaced passages extending between adjacent electromagnets, the magnetic flux of respective electromagnets being directed through said passages in the same circular direction;

a pair of electrically conductive conduits positioned in each of said passages, each conduit permitting the flow of electrically conductive fluid therethrough; and electrical conductor means, situated on opposite sides of each of said conduits for directing the flow of electrical current through said conduits, and the electrically conductive fluid contained therein, in a direction orthogonal to both the flow of fluid and the magnetic flux directed through said passages.

2. The apparatus of claim 1 wherein each of said electrically conductive conduits has an inlet port and an outlet port, said apparatus further comprising:

first and second plural tube header assemblies respectively connected to each of said inlet and outlet ports of each of said conduits, each of said header assemblies having a plurality of tubes, and means for electrically insulating adjacent tubes.

3. The apparatus of claim 2 wherein each of said electromagnets includes a core and a coil wound on said core, the ends of each coil being connected to the electrical conductor means associated with the conduits positioned adjacent the ends of the core associated with said coil, said apparatus further including means for electrically insulating said pair of conduits, positioned in each of said passages, from each other and from the core of adjacently situated electromagnets.

4. The apparatus of claim 3 wherein each coil is in electrical series connection with the electrical conductor means connected thereto.

5. The apparatus of claim 4 wherein each conduit has a rectangular cross section, the width of said conduit cross section being substantially equal to the width of said toroidal cross section.

6. The apparatus of claim 4 wherein the wall portions of said conduits are fabricated from a relatively high resistivity material.

7. Apparatus for pumping electrically conductive fluid comprising:

a magnetic structure having at least one passage extending therethrough, said magnetic structure directing magnetic flux through said passage;

first and second conduits positioned in said passage;

electrical conductor means extending lengthwise along oppositely disposed sides of each of said conduits so as to make electrical connection therewith and therethrough with the electrically conductive fluid;

a layer of electrical insulating material between said first and second conduits;

means applying a current to said electrical conductor means for producing a current flow in said first conduit which is opposite to the current flow in said second conduit;

first and second plural tube header assemblies connected to the inlet and outlet portions, respectively, of each of said conduits with each of said tubes being electrically insulated from adjacent tubes, whereby the bypass current flow through said apparatus is minimized;

means for electrically insulating said first and second plural header assemblies associated with said first conduit from the first and second header assemblies associated with said second conduit; and first and second magnetic winding coils, said first winding coil associated with said first conduit, said second winding coil associated with said second conduit, said winding coils directing magnetic flux through said conduits in a direction substantially perpendicular to the flow of fluid, said winding coils being wound abount the magnetic structure.

8. The apparatus of claim 7 wherein each magnetic winding coil is in electrical series connection with the electrical conductor means of its associated conduit.

9. The apparatus of claim 8 wherein the magnetic structure is in the shape of toroid having a rectangular cross section.

10. The apparatus of claim 9 wherein each of said conduits has a rectangular cross section, the width of said conduit cross sections being substantially equal to said toroidal cross section.

References Cited
UNITED STATES PATENTS

| | | | |
|---|---|---|---|
| 2,770,196 | 11/1956 | Watt | 103—1 |
| 2,807,212 | 9/1957 | Lindenblad | 103—1 |
| 3,277,827 | 10/1966 | Roes | 103—1 |

ROBERT M. WALKER, Primary Examiner